(12) United States Patent
Bran

(10) Patent No.: US 12,474,815 B2
(45) Date of Patent: Nov. 18, 2025

(54) GRAPHICAL USER INTERFACE CONFIGURATION FOR DISPLAY AT AN OUTPUT INTERFACE DURING A VIDEO CONFERENCE

(71) Applicant: Zoom Communications, Inc., San Jose, CA (US)

(72) Inventor: Cary Arnold Bran, Vashon, WA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/741,135

(22) Filed: Jun. 12, 2024

(65) Prior Publication Data

US 2024/0329798 A1     Oct. 3, 2024

Related U.S. Application Data

(63) Continuation of application No. 17/728,615, filed on Apr. 25, 2022, now Pat. No. 12,039,140.

(51) Int. Cl.
*G06F 3/04815* (2022.01)
*G06F 3/04845* (2022.01)

(52) U.S. Cl.
CPC ...... *G06F 3/04815* (2013.01); *G06F 3/04845* (2013.01)

(58) Field of Classification Search
CPC ............. G06F 3/04815; G06F 3/04845; G06F 3/0481; H04N 7/147
See application file for complete search history.

(56) References Cited

U.S. PATENT DOCUMENTS

| | | |
|---|---|---|
| 8,537,196 B2 | 9/2013 | Hegde et al. |
| 8,797,377 B2 | 8/2014 | Mauchly et al. |
| 9,813,673 B2 | 11/2017 | Smits |
| 9,924,136 B1 * | 3/2018 | Faulkner ................ G06T 13/80 |
| 10,061,467 B2 | 8/2018 | Brunsch et al. |
| 10,509,964 B2 | 12/2019 | Astavans et al. |
| 10,750,124 B2 | 8/2020 | Rosenberg |
| 10,880,582 B2 | 12/2020 | Goldman et al. |

(Continued)

FOREIGN PATENT DOCUMENTS

EP     2614637 B1     9/2018

*Primary Examiner* — Asher D Kells
(74) *Attorney, Agent, or Firm* — Young Basile Hanlon & MacFarlane, P.C.

(57) ABSTRACT

A graphical user interface (GUI) may be configured for display at an output interface during a video conference. The GUI may comprise visual elements associated with participant devices of the video conference. For example, the visual elements may include video feeds and/or images associated with the participant devices. During the video conference, a first visual element may be moved to a location in the GUI based on a characteristic associated with the first visual element. The characteristic and the location may be based on an input. In some implementations, the visual elements may be arranged in a two-dimensional visual layout. In some implementations, the visual elements may be arranged in a three-dimensional visual layout. The visual elements may be moved, for example, based on a communication sent during the video conference, an arrival of a participant to the video conference, and/or a communication modality used during the video conference.

20 Claims, 12 Drawing Sheets

(56) References Cited

U.S. PATENT DOCUMENTS

| | | | |
|---|---|---|---|
| 11,394,925 B1 | 7/2022 | Faulkner et al. | |
| 2002/0093531 A1 | 7/2002 | Barile | |
| 2005/0099492 A1 | 5/2005 | Orr | |
| 2007/0171275 A1 | 7/2007 | Kenoyer | |
| 2010/0085416 A1 | 4/2010 | Hegde et al. | |
| 2012/0274736 A1* | 11/2012 | Robinson | H04N 7/15 348/E7.083 |
| 2016/0308920 A1 | 10/2016 | Brunsch et al. | |
| 2017/0351476 A1 | 12/2017 | Yoakum | |
| 2020/0371677 A1* | 11/2020 | Faulkner | G06F 3/14 |
| 2022/0103963 A1* | 3/2022 | Satongar | H04N 7/147 |
| 2022/0150288 A1 | 5/2022 | Tokuchi | |
| 2023/0044865 A1 | 2/2023 | Pitts et al. | |

\* cited by examiner

GRAPHICAL USER INTERFACE CONFIGURATION FOR DISPLAY AT AN OUTPUT INTERFACE DURING A VIDEO CONFERENCE

CROSS-REFERENCE TO RELATED APPLICATION(S)

This application is a continuation of U.S. patent application Ser. No. 17/728,615, filed Apr. 25, 2022, the entire disclosure of which is hereby incorporated by reference.

FIELD

This disclosure relates generally to communication management and, more specifically, to configuring a graphical user interface (GUI) for display at an output interface during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
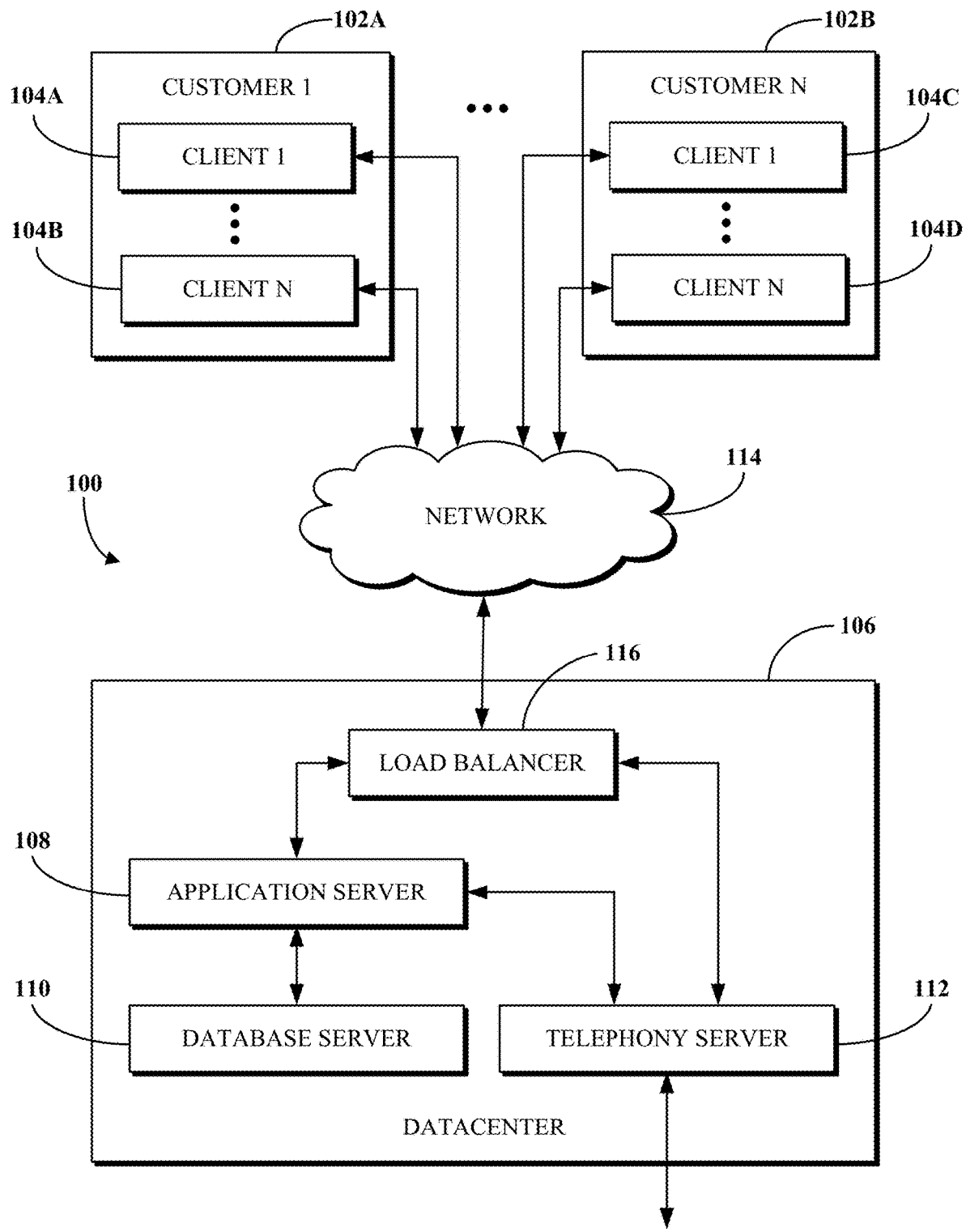
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a software platform such as a unified communications as a service (UCaaS) platform, which includes several communications services integrated over a network, such as the Internet, to deliver a complete communication experience regardless of physical location.

A UCaaS platform may in particular permit video conferencing between participants at different locations. During a video conference, conferencing software of the UCaaS platform may configure a graphical user interface (GUI) that is output for display at an output interface for rendering visual elements associated with a video conference. The visual elements may be arranged in a visual layout, such as video feeds associated with conference participants, static images associated with participants, content being shared between participants (e.g., documents, presentations, and videos), chat messages between participants, and/or a roster of participants present in the conference. For example, one visual layout may include video feeds of participants arranged along a bottom of the GUI, content being shared in an upper center of the GUI, chat communications in an upper right of the GUI, and/or a roster in an upper left of the GUI. A video conference participant may view the visual elements when participating in the conference. While the visual elements may be arranged in different visual layouts, the visual layouts may be overcrowded at times, particularly when there are numerous participants in the conference. Additionally, the GUI may not be ideal for a group of participants in a room where individual participants may be in different areas of the room with different viewing angles. This may cause distraction for the participants, thereby limiting their ability to participate in the conference.

Implementations of this disclosure address problems such as these by permitting a user to configure a GUI to move visual elements, during a video conference, to user defined locations in the GUI based on user defined characteristics associated with the visual elements. For example, the GUI may be displayed in a room to enhance participation of a group of participants in the room. The characteristics and/or the locations may be determined based on user input, such as by a user selecting a template that specifies a visual layout and/or by changing the template. The characteristics may include, for example, a communication sent during the video conference (e.g., a communication sent by participant, such as an indication of a virtual hand being raised or a participant speaking), arrival of a participant to the video conference (e.g., a participant joining the conference), and/or a communication modality being used (e.g., a particular display and/or capture device used by a participant, which could have two-dimensional or three-dimensional properties). In some implementations, the visual elements may be arranged in a two-dimensional visual layout (e.g., height and width dimensions, which may be specified based on a Cartesian coordinate system using X and Y axes). For example, the visual elements may be output for display to a two-dimensional output interface (e.g., a liquid crystal display, a cathode-ray tube, or a light emitting diode display). Moving the visual elements in the visual layout may include moving in two-dimensions (e.g., up and down or side to side), resizing, fading, and/or ordering relative to one another. In some implementations, the visual elements may be arranged in a three-dimensional visual layout (e.g., height, width, and depth dimensions, which may be specified based on a Cartesian coordinate system using X, Y, and Z axes). For example, the visual elements may be output for display to a three-dimensional output interface (e.g., a holographic display, a virtual reality headset, or an alternate reality headset). Moving the visual elements in the visual layout may include moving in three-dimensions (e.g., up and down, side to side, and/or front to back), turning at angles (e.g., facing different directions relative to one another), tilting, resizing, fading, and/or ordering relative to one another. In some implementations, audio aspects of the conference (e.g., volume) may also be controlled in a physical meeting room based on spatial mapping of the visual elements in the GUI.

To describe some implementations in greater detail, reference is first made to examples of hardware and software structures used to implement a system to configure a GUI for display at an output interface during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
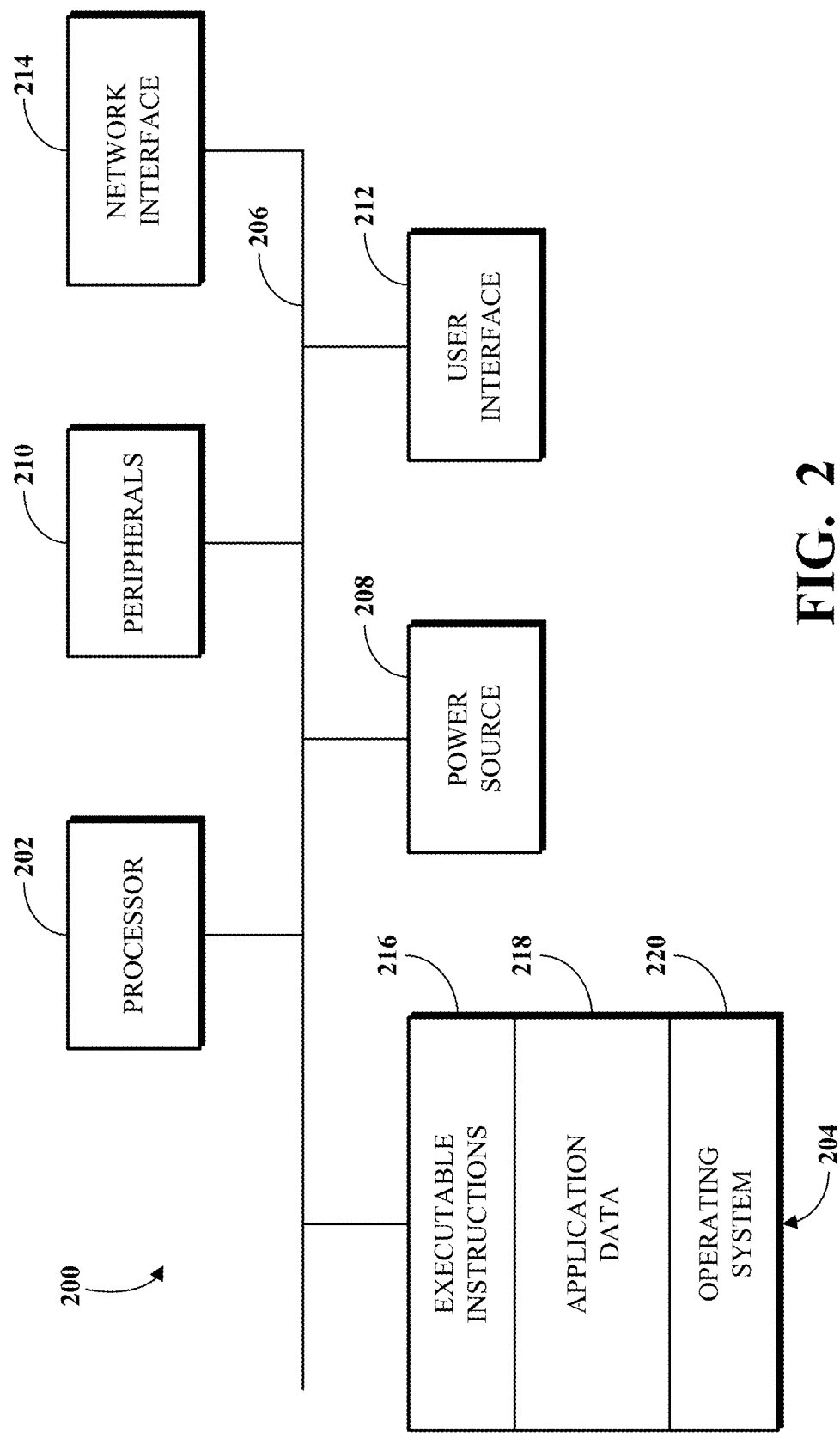
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
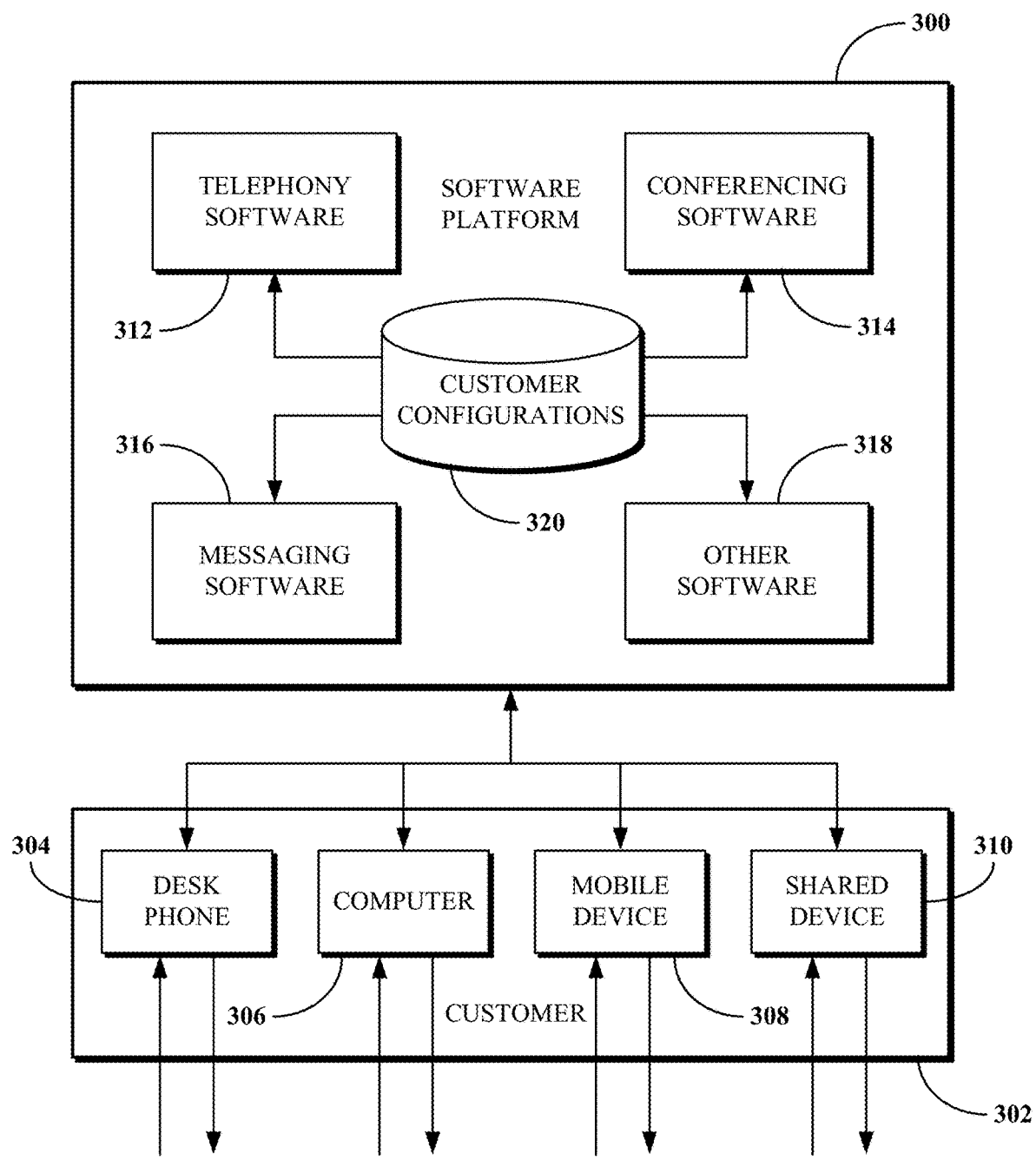
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for configuring a GUI for display at an output interface during a video conference. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
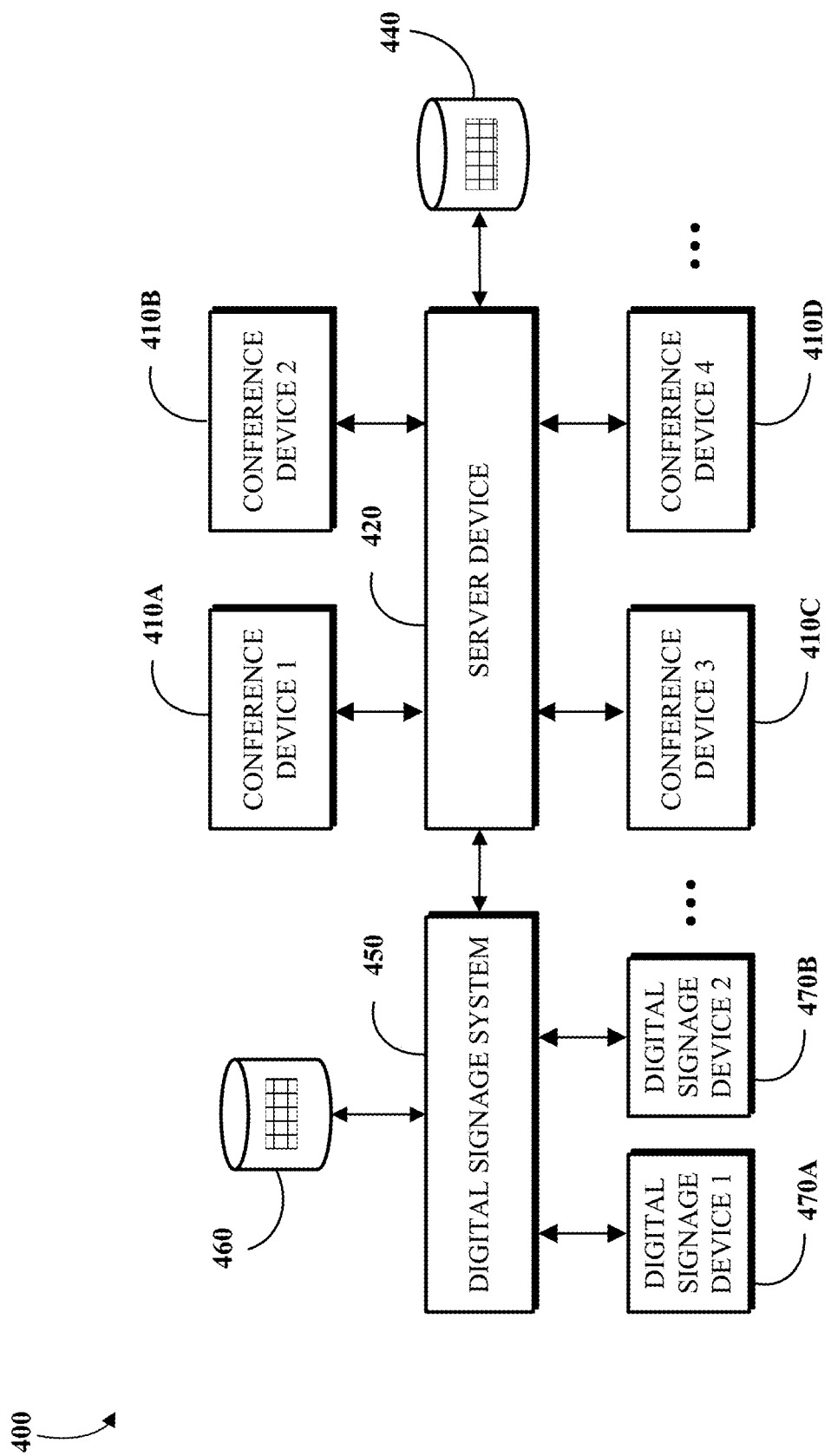
FIG. 4 is a block diagram of an example of a system for configuring a GUI for display at an output interface during a video conference.

FIG. 4 is a block diagram of an example of a system 400 for configuring a GUI for display at an output interface during a video conference. The system 400 may include one or more conference devices that can be used by participants of the video conference, such as conference devices 410A through 410D. For example, a conference device could be a client device such as one of the clients 104A through 104D shown in FIG. 1 or 304 through 310 shown in FIG. 3. A conference device could be operated by a single user in a physical space (e.g., a participant at a different location or a remote location), such as an individual in a classroom, office, conference room, or other space, in which case the conference device may be a single-user device. Alternatively, the conference device could be operated by multiple users in a same physical space (e.g., multiple in-person participants in a group), such as individuals together in a classroom, office, conference room, or other space (e.g., a physical meeting room), in which case the conference device may be a shared device. The conference devices 410A through 410D may execute software (e.g., client-side conferencing software implemented via a client application or a web application) to connect to a server device 420. The server device 420 may execute software (e.g., server-side conferencing software) to support a video conference between participants using the conference devices 410A through 410D. For example, the server device 420 could be a server at the datacenter 106 shown in FIG. 1.

During a video conference, the conferencing software (e.g., the client-side conferencing software and/or the server-side conferencing software) may configure a GUI that is output for display at an output interface associated with a conference device. For example, a first GUI may be configured for display at an output interface associated with the conference device 410A; a second GUI may be configured for display at an output interface associated with the conference device 410B; and so forth. The output interface could be implemented by the user interface 212 shown in FIG. 2. The output interface may, for example, be a display, such as a liquid crystal display, a cathode-ray tube, a light emitting diode display, a virtual reality display, a holographic display, a virtual reality display or headset, an alternate reality display or headset, or other suitable display. Thus, the GUI may be configured for display in a two-dimensional visual layout or a three-dimensional visual layout.

The GUI may include visual elements arranged in a visual layout. The visual elements may include, for example, video feeds associated with participants, static images associated with participants (such as pictures, symbols, icons, and the like, which could be used by participants when the participants are not using video feeds), content being shared between participants (e.g., documents, presentations, and videos), chat messages between participants, a roster of participants present in the conference, and/or other applications used during a conference. For example, one visual layout may include video feeds of participants arranged along a bottom of the GUI, content being shared in an upper center of the GUI, chat communications in an upper right of the GUI, and/or a roster in an upper left of the GUI. A participant may view the visual elements, via the output interface, when participating in the conference. In some implementations, the visual elements may include applications such as a digital whiteboard used to enable virtual collaboration between remote participants and/or participants at different locations. In some implementations, the visual elements may include video feeds of individual participants (e.g., user tiles) generated from a single video feed of the participants in a same physical space or meeting room. For example, a camera may be used to detect individual participants in a same physical space, then a video feed from the camera may be processed to produce multiple video feeds for the individual participants.

To reduce possible overcrowding of visual elements during a video conference, particularly when numerous participants join the conference, and/or to improve the experience of participants viewing the visual layout, the GUI may be configured to move visual elements to locations in the GUI. The visual elements may be moved during a video conference based on user defined characteristics associated with the visual elements. For example, a participant using the conference device 410A may configure a GUI to move visual elements in a first user defined way; a participant using the conference device 410B may configure a GUI to move visual elements in a second user defined way; and so forth. As a result, participants using different conference device (e.g., the conference devices 410A through 410D) may have different visual experiences during the conference. This may permit displaying the GUI in way that enhances participation of a group in a physical meeting room.

The characteristics associated with the visual elements and/or the locations in the GUI may be determined based on user input. In some implementations, the participant may provide the user input by indicating selections, such as a selection of a characteristic associated with a visual element and a selection of a location of the visual element in the GUI. In some implementations, the participant may provide the input by selecting a template. The template may specify the characteristics associated with the visual elements and/or the locations in the GUI. For example, the server device 420 may communicate with a GUI data structure 440 (e.g., a data store) that stores multiple templates. The participant, using a conference device (e.g., the conference device 410A), may select a template from the GUI data structure 440, via the server device 420. In one configuration, the participant may commit the selected template for use during the video conference. In another configuration, the participant may revise the template, such as by changing a characteristic associated with a visual element and/or a location in the GUI. The participant may then commit the revised template for use during the video conference. This may permit the participant to customize a visual layout in a GUI for a participant's own environment, such as for a physical meeting room accommodating a group of participants.

The characteristics associated with the visual elements may include, for example, communications during the video conference (e.g., a communication sent by a participant, such as an indication of a virtual hand being raised or a participant speaking); arrival of participants to the video conference (e.g., joining the conference, in an order relative to other participants); communication modalities used by participants (e.g., a particular display and/or capture device used by a participant, which could have two-dimensional properties or three-dimensional properties); and/or assignment of participants to virtual breakout rooms or sessions. When a characteristic associated with a visual element is configured by a participant, the visual element may move during the video conference based on the characteristic. In some implementations, object detection via a video feed, and/or a machine learning model, may be used to detect the characteristic during the video conference. The visual element may move to a location in the GUI which may be configured by the participant, such as a top, bottom, left, right, center, and/or combination thereof (e.g., in a two-dimensional visual layout), or a top, bottom, left, right, center, front, back, angle, and/or combination thereof (e.g., in a three-dimensional visual layout). Thus, the location in the GUI may include a coordinate location that may result in a direction. The location could be specified by position information, such as coordinates in a Cartesian coordinate system, and/or by user defined areas, zones, ranges, or regions. This may permit participants using different conference devices (e.g., the conference devices 410A through 410D) to have different experiences.

By way of example, in one configuration, when the characteristic is a communication sent during the video conference, such as an indication of a virtual hand being raised, the communication may be configured to cause the video feed of a participant associated with the communication to move during the video conference. In another configuration, when the characteristic is an arrival of a participant to the video conference, the arrival may be configured to cause the video feed of the participant arriving to the conference to move (e.g., to the front, until the arrival of a next participant to the conference). In another configuration, when the characteristic is a communication modality used by a participant (e.g., a particular display and/or capture device), the modality may be configured to cause the video feed of the participant using the modality to move during the video conference. In another configuration, when the characteristic is a communication sent during the video conference (e.g., content being shared by a participant, such as a document, presentation, or video), the communication may be configured to cause the content to move during the video conference (e.g., content sharing may move to the front and video feeds of participants may be reduced in size and sent backward). In another configuration, when the characteristic is a communication sent during the video conference (e.g., a notification message or "toast," such as from a virtual lobby or waiting area for participants waiting to join the conference), the communication may be configured to cause a notification message or chat to move during the video conference (e.g., the notification message may appear up front and on top of other visual elements, then may fade backwards after a period of time).

In some implementations, the visual elements may be arranged in a two-dimensional visual layout having height and width dimensions. For example, the two-dimensional visual layout may be specified in a spatial mapping, such as Cartesian coordinates using X and Y axes. The visual elements may be displayed at an output interface having two-dimensional properties, such as a liquid crystal display, a cathode-ray tube, or a light emitting diode display. Moving the visual elements in the visual layout may include moving in two-dimensions, such as up and down and/or side to side. Moving the visual elements may also include resizing or fading the visual elements over a time period and/or ordering the visual elements relative to one another, such as by overlapping one visual element with another. Moving the visual elements may involve calculating a change to position information associated with the visual elements, such as a change to Cartesian coordinates in two-dimensions.

In some implementations, the visual elements may be arranged in a three-dimensional visual layout having height, width, and depth dimensions. For example, the three-dimensional visual layout may be specified in a spatial mapping, such as Cartesian coordinates using X, Y, and Z axes. The visual elements may be displayed at an output interface having three-dimensional properties, such as a holographic display, a virtual reality display, a virtual reality headset, an alternate reality display, or an alternate reality headset. Moving the visual elements in the visual layout may include moving in three-dimensions, such as up and down, side to side, and/or front to back. Moving the visual elements may also include turning at angles relative to one another (e.g., facing different directions relative to one another), tilting, resizing, or fading the visual elements over a time period, and/or ordering the visual elements relative to one another, such as by moving one visual element in front of or behind another. Moving the visual elements may involve calculating a change to position information associated with the visual elements, such as a change to Cartesian coordinates in three-dimensions.

In some implementations, audio aspects of the conference (e.g., volume) may be controlled in relation to the spatial mapping of the visual elements. For example, when a first video feed associated with a participant overlaps a second video feed in a GUI (e.g., in a two-dimensional visual layout) or is moved in front of a second video feed in a GUI (e.g., in a three-dimensional visual layout), audio associated with the first video feed may be proportionally increased. Similarly, when a first video feed associated with a participant is overlapped by a second video feed in a GUI (e.g., in a two-dimensional visual layout) or is moved behind a second video feed in a GUI (e.g., in a three-dimensional visual layout), audio associated with the first video feed may be proportionally decreased. In some implementations, the audio may be controlled in a physical meeting room in three-dimensions based on the spatial mapping of the visual elements. For example, when a first video feed associated with a participant overlaps a second video feed in a GUI or is moved in front of a second video feed in a GUI, audio associated with the first video feed may be controlled to increase in the front of the physical meeting room and decrease in the back of the room. Similarly, when a first video feed associated with a participant is overlapped by a second video feed in a GUI or is moved behind a second video feed in a GUI, audio associated with the first video feed may be controlled to decrease in the front of the physical meeting room and increase in the back of the room. Audio may be similarly controlled to increase or decrease on a left side of a room versus a right side of a room and/or in an upper part of a room versus a lower part of a room, based on movement of a visual element in the GUI.

In some implementations, the server device 420 may communicate with a digital signage system 450 (e.g., a digital signage service) to cause a display of digital signage, such as visual elements associated with participants of the video conference. For example, the digital signage system 450 could be implemented by the server device 420 or another server at the datacenter 106 shown in FIG. 1. The digital signage system 450 could execute digital signage software (e.g., which may respond to calls from the server device 420) to determine the location and/or availability of digital signage devices (e.g., smart TVs, screens, monitors, and the like, which may include computers for communicating in the system 400), such as digital signage devices 470A and 470B. For example, the location and/or availability of the digital signage devices 470A and 470B may be specified in a digital signage data structure 460. The digital signage data structure 460 could be a data store that is accessible to the digital signage system 450. In some implementations, the digital signage system 450 may receive visual elements associated with participants of the video conference, such as a roster of participants present in the conference. The digital signage system 450 may push updates to the digital signage devices (e.g., the digital signage devices 470A and 470B), based on their availability, that cause the digital signage devices to display the visual elements. In some implementations, the digital signage system is implemented locally at a premises at which conference participants are located. In some implementations, the digital signage service is implemented by the software platform. In some implementations, the digital signage service is implemented by a service external to the software platform.

Figure 5:
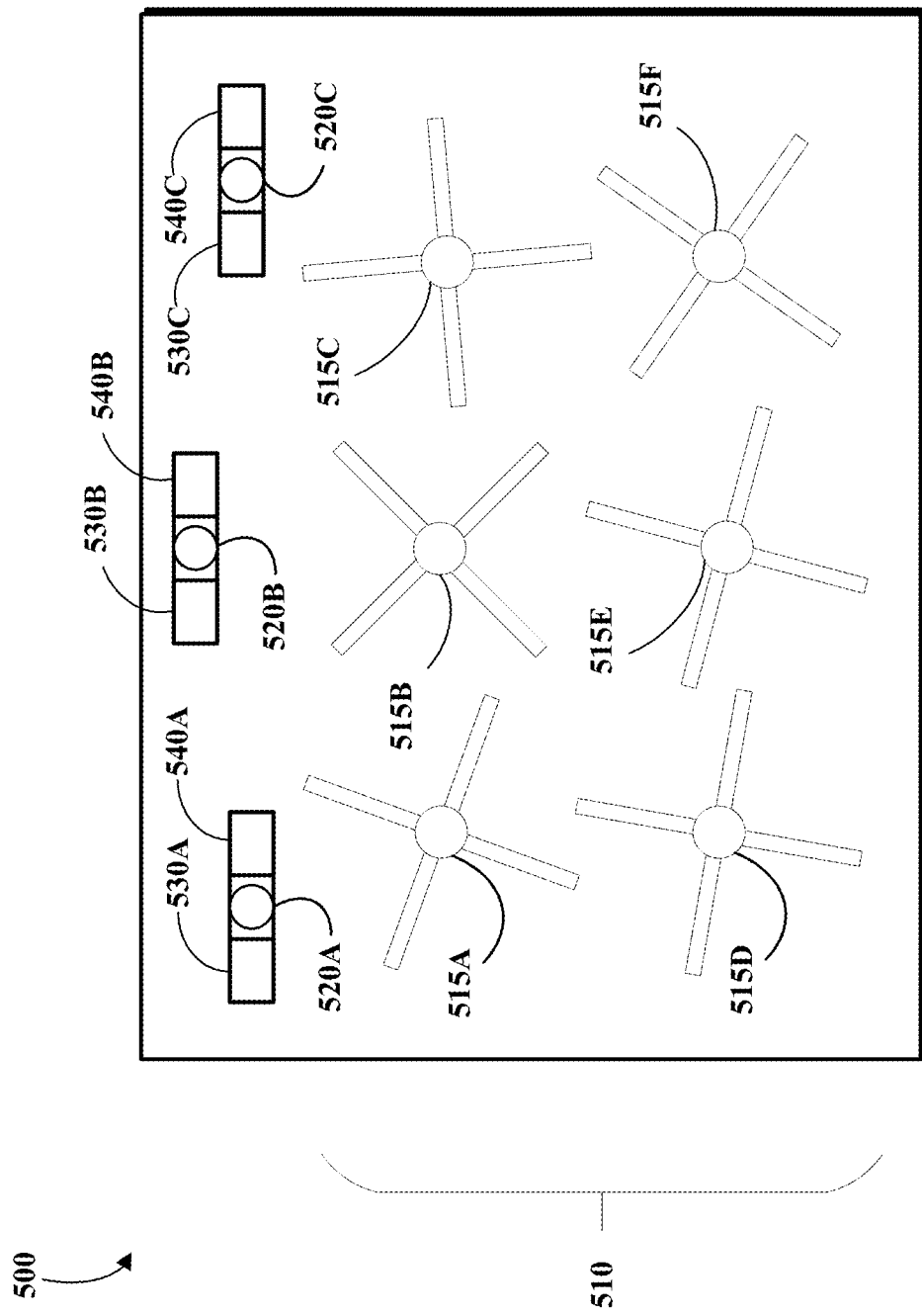
FIG. 5 is an example of a system including an output interface for displaying a GUI.

FIG. 5 is an example of a system 500 including an output interface 510 for displaying a GUI. For example, the system 500 could be implemented in a physical space for accommodating a group of participants. The system 500 could be used by a conference device like one of the conference devices 410A through 410D shown in FIG. 4. The output interface 510 could be used to display a GUI in three-dimensions. The output interface 510 may comprise a wall of three-dimensional holographic displays, such as holographic displays 515A through 515F mounted in the physical meeting room. The holographic displays may be configured to operate in concert with one another to display the GUI in a three-dimensional visual layout. For example, each holographic display may include blades having light emitting diodes that are configured to rotate at a speed to produce a holographic affect to the human eye. As a result, visual elements in the GUI may be displayed with depth dimensions in addition to height and width dimensions. In another example, the output interface could comprise a single three-dimensional holographic display (e.g., one of the holographic displays 515A through 515F).

The system 500 may also include one or more cameras, microphones, and/or speakers, such as cameras 520A through 520C, microphones 530A through 530C, and speakers 540A through 540C. The cameras, microphones, and/or speakers may be placed at different locations in the physical meeting room for achieving three-dimensional spatial mappings of video and/or audio in the room. For example, the cameras 520A through 520C may be arranged in the room to capture a three-dimensional image of one or more participants for three-dimensional display of a video feed in the GUI. In some implementations, the cameras 520A through 520C may be used to holographically display one or more participants in three-dimensions during the video conference. The microphones 530A through 530C may be arranged in the room to capture surround sound of the one or more participants in the room for playing with a video feed in the GUI. The speakers 540A through 540C may be arranged in the room (e.g., an array of speakers) for playing surround sound of the video conference to one or more participants in the room. In some implementations, the speakers 540A through 540C may be used to control audio in relation to the spatial mapping of visual elements in the GUI, including as described in FIG. 4.

Figure 6:
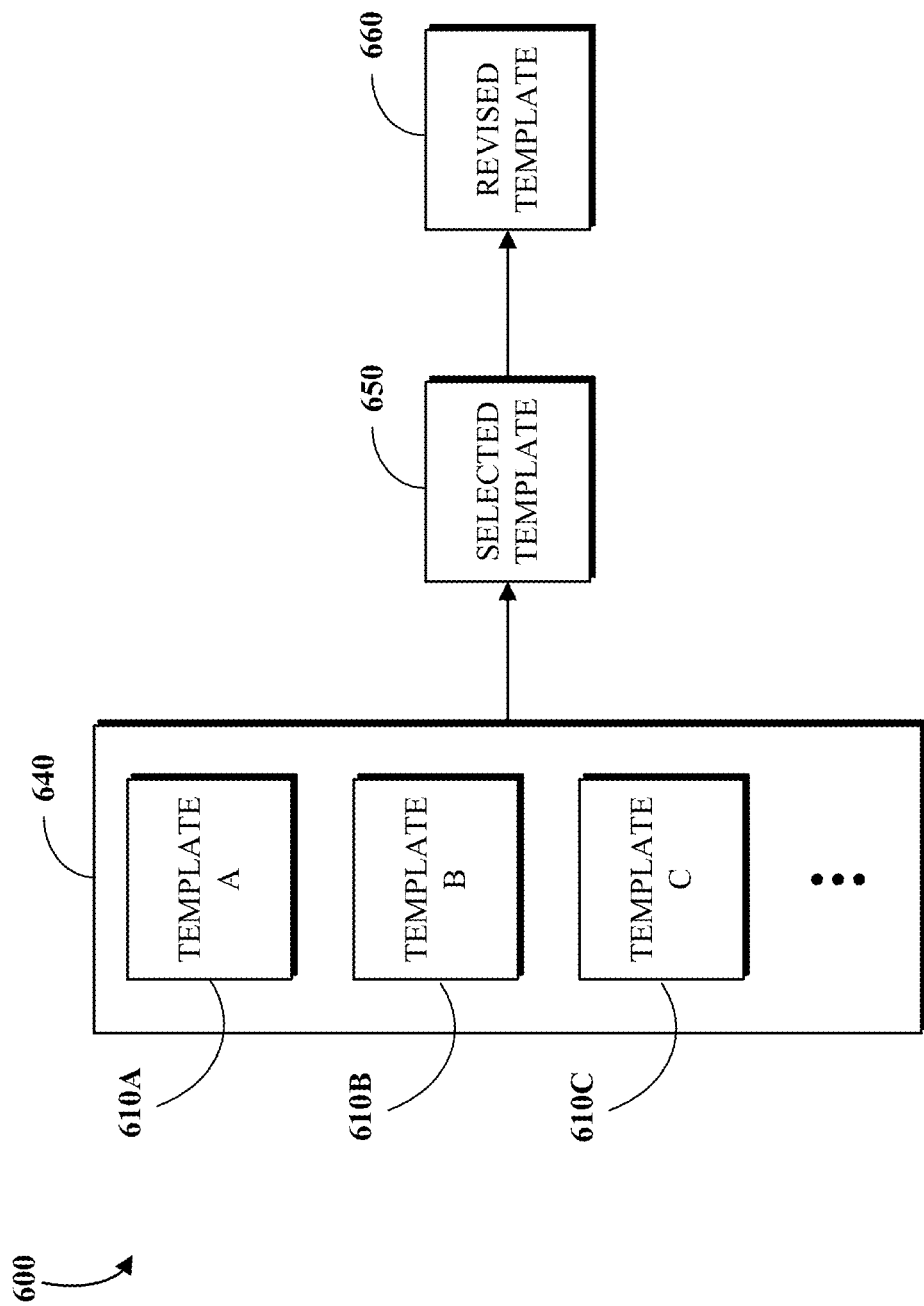
FIG. 6 is an example of a technique for selecting a template that specifies a visual layout for a GUI.

FIG. 6 is an example of a technique 600 for selecting a template that specifies a visual layout for a GUI. Multiple templates may be stored in a data structure 640, such as templates 610A through 610C. The data structure 640 may be like the GUI data structure 440 shown in FIG. 4. The templates may comprise a library of templates that are different from one another. The templates may specify characteristics associated with visual elements and/or locations in GUIs in predetermined visual layouts. The templates configure the visual elements in two-dimensions and/or three-dimensions. In some implementations, the templates may be configured for serving different environments, such as classrooms, conference rooms, offices, contact centers, entertainment forums, and the like. For example, the visual elements in one template may be arranged to provide a multimodal means of communications between customers and agents for a contact center. The visual elements in another template may be arranged to provide a format for a lecture, such as for a classroom or other teaching environment. Thus, the templates could be used to define particular in-room meeting experiences for participants.

A participant may provide user input that indicates selection of a template from the data structure 640, such as a selected template 650. For example, the selected template 650 could be one of the templates 610A through 610C. In some implementations, the selected template 650 may be automatically selected. For example, a communication modality used by a participant may be detected and used as a basis for automatically selecting the template. This may permit, for example, detecting the capability of a participant's output interface, such as a two-dimensional display versus a three-dimensional display, and creating a video conference experience based on the capability.

In some implementations, the participant may provide user input to revise the selected template 650 to form a revised template 660. For example, the participant may change one or more characteristics associated with one or more visual elements and/or one or more locations associated with one or more visual elements. The participant may commit the selected template 650 or the revised template 660 for use during a video conference (e.g., for use in connection with the conference device 410A during a video conference). This may permit the participant to customize a visual layout in a GUI for the participant's own environment, such as for a physical meeting room accommodating a group of participants.

Figure 7:
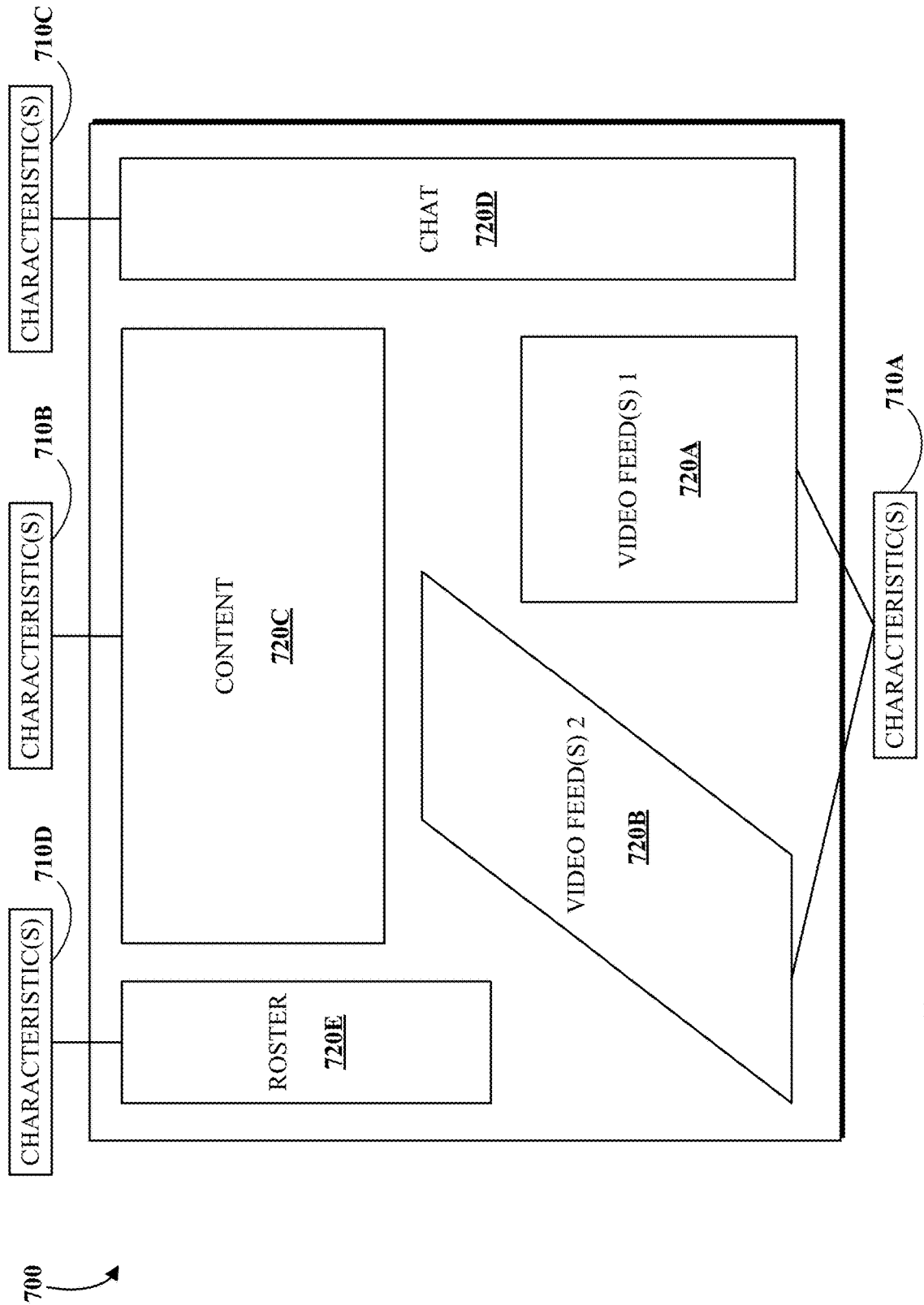
FIG. 7 is an example of characteristics associated with visual elements at locations in a GUI.

FIG. 7 is an example of characteristics associated with visual elements at locations in a GUI 700. The characteristics and/or the locations may be determined based on user input, such as the characteristics 710A through 710D associated with visual elements 720A through 720E at locations in the GUI 700. In some implementations, a participant may provide the input by indicating selections of the characteristics and/or the locations, such as a selection of the characteristic 710A associated with the visual elements 720A and 720B at locations comprising the lower middle and the lower left side of the GUI 700, respectively. In some implementations, the participant may provide the input by selecting a template that specifies the characteristics associated with the visual elements at the locations in a predetermined visual layout. For example, the participant may select a template like the selected template 650 or the revised template 660 shown in FIG. 6.

The visual elements may be configured in many different ways in the GUI 700. For example, in one configuration, the characteristic 710A may be a communication sent during the video conference, such as an indication of a virtual hand being raised. The communication may be configured to cause a video feed of a participant associated with the communication to move from the visual element 720A (e.g., among an audience of smaller user tiles) to the visual element 720B (e.g., in a queue of larger user tiles associated with participants that sent the communication). The visual element 720A may be specified at a lower middle location in the GUI 700, and the visual element 720B may be specified at a lower left location in the GUI 700. In another configuration, the characteristic 710A may be an arrival of a participant to the video conference. The arrival may be configured to cause a video feed of a participant arriving to the video conference to be placed in the visual element 720B (e.g., as a larger user tile associated with a participant that recently joined the conference), then moved to the visual element 720A (e.g., an audience of smaller user tiles) following the later arrival of another participant. In another configuration, the characteristic 710B may be a communication sent during the video conference, such as content being shared by a participant. The communication may be configured to cause the visual element 720C (e.g., the content being shared) to move to a location at the front of the GUI 700, and video feeds of participants (e.g., the visual element 720A) to be reduced in size and sent backward in the GUI 700. In another configuration, the characteristic 710C may be a communication sent during the video conference, such as a chat. The communication may be configured to cause the visual element 720D (e.g., chat messages) to appear at a right side location in the GUI 700, then fade away (e.g., disappear) following a period of inactivity. In another configuration, the characteristic 710D may be an arrival of a participant to the video conference. The arrival may be configured to cause the visual element 720E (e.g., the roster of participants in the conference) to appear at a left side location in the GUI 700, then fade away following a period of inactivity. Thus, the visual elements may be configured in many different ways in the GUI 700, as desired by a participant, for use during a video conference.

Figure 8:
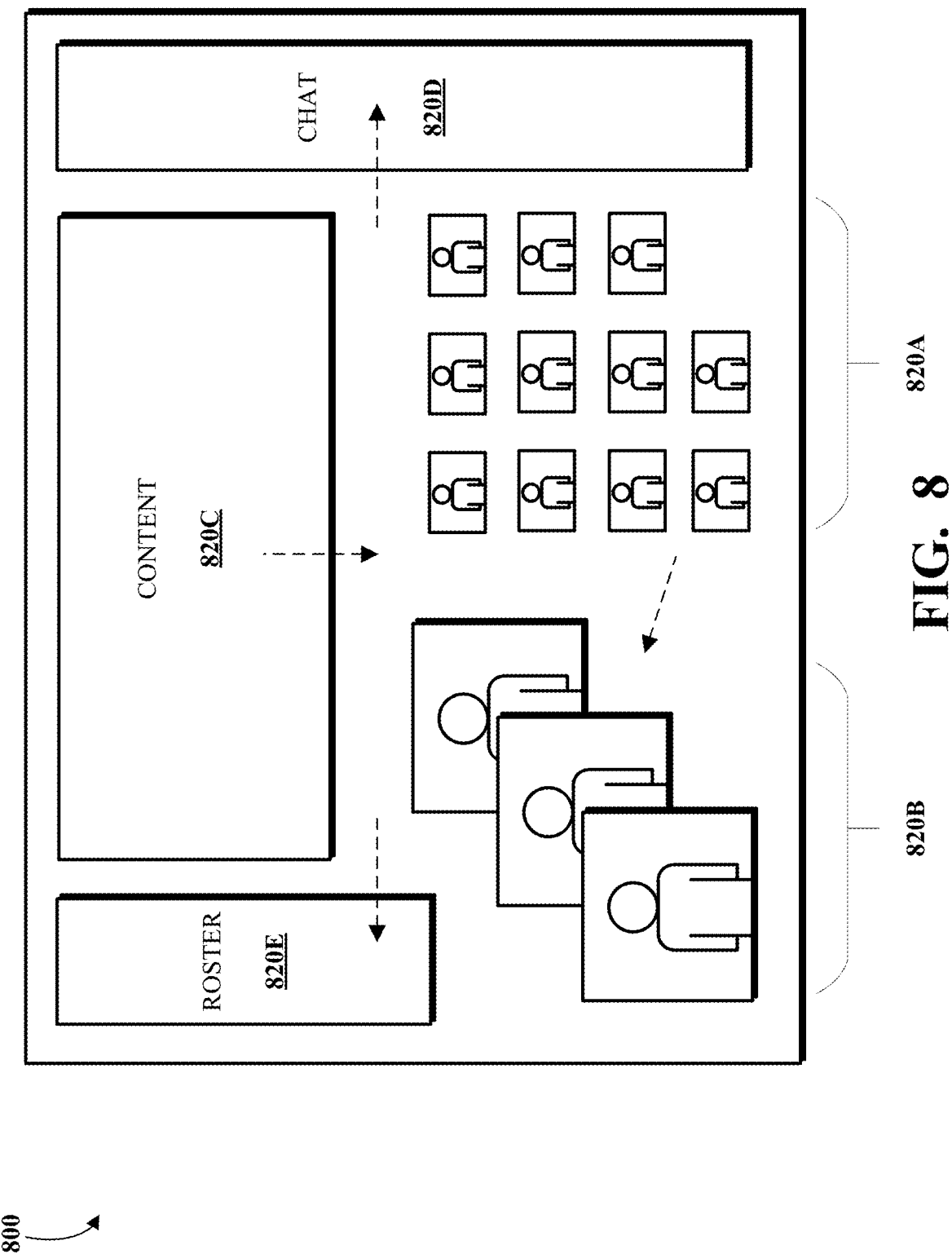
FIG. 8 is an illustration of an example of a GUI configured for display at an output interface in which visual elements are arranged in a two-dimensional visual layout.

FIG. 8 is an illustration of an example of a GUI 800 configured for display at an output interface in which visual elements are arranged in a two-dimensional visual layout. The GUI 800 may include visual elements associated with participants of the video conference, such as visual elements 820A through 820E. For example, the visual element 820A may comprise additional visual elements (e.g., sub-visual elements), such as video feeds associated with participants (e.g., smaller user tiles of participants) and/or static images associated with participants; the visual element 820B may also comprise additional visual elements, such as additional video feeds associated with participants (e.g., larger user tiles of select participants) and/or static images associated with participants; the visual element 820C may comprise content being shared between participants (e.g., documents, presentations, and videos); the visual element 820D may comprise chat messages between participants; and the visual element 820E may comprise a roster of participants present in the conference. In some implementations, the visual elements 820A through 820E may be configured based on characteristics, like the GUI 700 shown in FIG. 7.

The visual elements 820A through 820E may be arranged in many different ways in the GUI 800. For example, the visual element 820A (e.g., video feeds associated with participants and/or static images associated with participants) may be presented in front of all other visual elements when no content is being shared, no chat messages are being sent, and/or there are no changes to the roster of participants. The visual element 820D (e.g., chat messages) and the visual element 820E (e.g., roster of participants) may be located on the periphery of the GUI 800 and/or in the background.

In one configuration, a characteristic may comprise a communication sent during the video conference, such as an indication of a virtual hand being raised. The communication may be configured to cause a video feed of a participant associated with the communication to move from the visual element 820A (e.g., among an audience of smaller user tiles) to the visual element 820B (e.g., in a queue of larger user tiles associated with participants that have sent the communication). The visual element 820A may be specified at a lower middle location in the GUI 800, and the visual element 820B may be specified at a lower left location in the GUI 800. Moreover, the video feeds of participants in the visual element 820B may overlap one another based on an order in which the indication was sent. This may be useful, for example, in environments in which participants wish to ask questions and/or take a turn to present. Moving the video feed may make the participant more or less visually prominent during the conference. In another configuration, the characteristic may comprise an arrival of a participant to the video conference. The arrival may be configured to cause a video feed of a participant arriving to the video conference to be placed in the visual element 820B (e.g., as a larger user tile associated with a participant that recently joined the conference), then moved to the visual element 820A (e.g., an audience of smaller user tiles) following the later arrival of another participant. The video feeds of participants in the visual element 820B may overlap one another based on an order of the participants arrival to the conference. In another configuration, the characteristic may comprise a communication sent during the video conference, such as content being shared by a participant. The communication may be configured to cause the visual element 820C (e.g., the content being shared) to overlap other visual elements at the front of the GUI 800, and video feeds of participants (e.g., the visual element 820A) to be reduced in size and be overlapped by the visual element 820C. In another configuration, the characteristic may comprise a communication sent during the video conference, such as a chat. The communication may be configured to cause the visual element 820D (e.g., chat messages) to appear at a front and right side location in the GUI 800, then fade away (e.g., disappear) following a period of inactivity. In another configuration, the characteristic may comprise an arrival of a participant to the video conference. The arrival may be configured to cause the visual element 820E (e.g., the roster of participants in the conference) to appear at a front and left side location in the GUI 800, then fade away following a period of inactivity.

Thus, the visual elements 820A through 820E may be arranged in the two-dimensional visual layout based on height and width dimensions. For example, the two-dimensional visual layout may be specified in a spatial mapping, such as Cartesian coordinates using X and Y axes. The visual elements 820A through 820E may be displayed at an output interface having two-dimensional properties. Moving the visual elements 820A through 820E in the visual layout may include moving in two-dimensions, such as up and down and/or side to side. Moving the visual elements 820A through 820E may also include resizing or fading the visual elements over a time period, and/or ordering the visual elements 820A through 820E relative to one another, such as by overlapping one visual element with another. Moving the visual elements 820A through 820E may involve calculating a change to position information associated with the visual elements 820A through 820E, such as a change to Cartesian coordinates in two-dimensions. Thus, the visual elements may be configured in many different ways in the two-dimensional visual layout, as desired by a participant, for use during a video conference.

Figure 9:
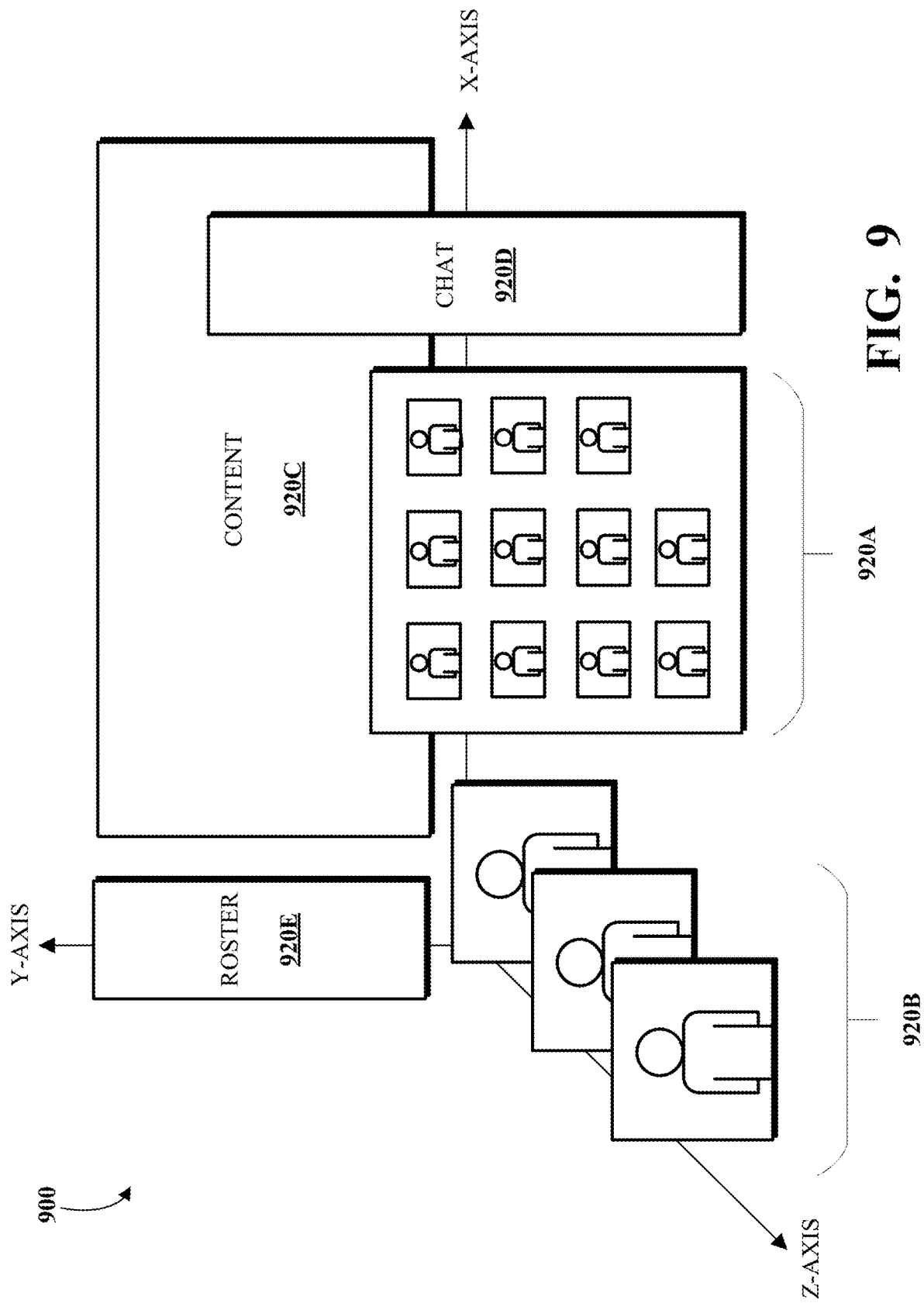
FIG. 9 is an illustration of an example of a GUI configured for display at an output interface in which visual elements are arranged in a three-dimensional visual layout.

FIG. 9 is an illustration of an example of a GUI configured for display at an output interface in which visual elements are arranged in a three-dimensional visual layout. The GUI 900 may include visual elements associated with participants of the video conference, such as visual elements 920A through 920E. For example, the visual element 920A may comprise additional visual elements (e.g., sub-visual elements), such as video feeds associated with participants (e.g., smaller user tiles of participants) and/or static images associated with participants; the visual element 920B may also comprise additional visual elements, such as additional video feeds associated with participants (e.g., larger user tiles of select participants) and/or static images associated with participants; the visual element 920C may comprise content being shared between participants (e.g., documents, presentations, and videos); the visual element 920D may comprise chat messages between participants; and the visual element 920E may comprise roster of participants present in the conference. In some implementations, the video feeds associated with participants and/or the static images associated with participants may be used to holographically display one or more of the participants in three-dimensions. In some implementations, the visual elements 920A through 920E may be configured based on characteristics, like the GUI 700 shown in FIG. 7.

The visual elements 920A through 920E may be arranged in many different ways in the GUI 900. Further, by utilizing three-dimensions, the visual elements 920A through 920E may be arranged to take advantage of spatial properties in a room. For example, the visual element 920A (e.g., video feeds associated with participants and/or static images associated with participants) may be presented in front of all other visual elements (e.g., in the depth dimension) when no content is being shared, no chat messages are being sent, and/or there are no changes to the roster of participants. The visual element 920D (e.g., chat messages) and the visual element 920E (e.g., roster of participants) may be located on the periphery of the GUI 900 and/or behind the visual element 920A.

In one configuration, a characteristic may comprise a communication sent during the video conference, such as an indication of a virtual hand being raised. The communication may be configured to cause a video feed of a participant associated with the communication to move from the visual element 920A (e.g., among an audience of smaller user tiles) to the visual element 920B (e.g., in a queue of larger user tiles associated with participants that have sent the communication). The visual element 920A may be specified at a front and lower middle location in the GUI 900, and the visual element 920B may be specified at a front and lower left location in the GUI 900. Moreover, the video feeds of participants in the visual element 920B may be ordered with one in front of another based on an order in which the indication was sent. This may be useful, for example, in environments in which participants wish to ask questions and/or take a turn to present. Moving the video feed may make the participant more or less visually prominent during the conference. In another configuration, the characteristic may comprise an arrival of a participant to the video conference. The arrival may be configured to cause a video feed of a participant arriving to the video conference to be placed in the visual element 920B (e.g., as a larger user tile associated with a participant that recently joined the conference), then moved to the visual element 920A (e.g., an audience of smaller user tiles) following the later arrival of another participant. The video feeds of participants in the visual element 920B may be ordered with one in front of another based on an order of the participants arrival to the conference. In another configuration, the characteristic may comprise a communication sent during the video conference, such as content being shared by a participant. The communication may be configured to cause the visual element 920C (e.g., the content being shared) to move to a location in front to of other visual elements in the GUI 900, and video feeds of participants (e.g., the visual element 920A) to be reduced in size and sent backward in the GUI 900. In another configuration, the characteristic may comprise a communication sent during the video conference, such as a chat. The communication may be configured to cause the visual element 920D (e.g., chat messages) to appear at a front and right side location in the GUI 900, then move from front to back in the GUI 900, and/or fade away, following a period of inactivity. In another configuration, the characteristic may comprise an arrival of a participant to the video conference. The arrival may be configured to cause the visual element 920E (e.g., the roster of participants in the conference) to appear at a left side location in the GUI 900, then move from front to back in the GUI 900, and/or fade away, following a period of inactivity.

Thus, the visual elements 920A through 920E may be arranged in the three-dimensional visual layout with height, width, and depth dimensions. For example, the three-dimensional visual layout may be specified in a spatial mapping, such as Cartesian coordinates using X, Y, and Z axes. The visual elements 920A through 920E may be displayed at an output interface having three-dimensional properties, such as a holographic display, a virtual reality display, a virtual reality headset, an alternate reality display, or an alternate reality headset. For example, the visual elements 920A through 920E may be displayed at an output interface like the output interface 510 shown in FIG. 5. Moving the visual elements 920A through 920E in the visual layout may include moving in three-dimensions, such as up and down, side to side, and/or front to back. Moving the visual elements 920A through 920E may also include turning at angles relative to one another (e.g., facing different directions relative to one another), tilting, resizing, or fading the visual elements over a time period, and/or ordering the visual elements 920A through 920E relative to one another, such as by moving one visual element in front of or behind another. Moving the visual elements 920A through 920E may involve calculating a change to position information associated with the visual elements, such as a change to Cartesian coordinates in three-dimensions. Thus, the visual elements may be configured in many different ways in the three-dimensional visual layout, as desired by a participant, for use during a video conference.

Figure 10:
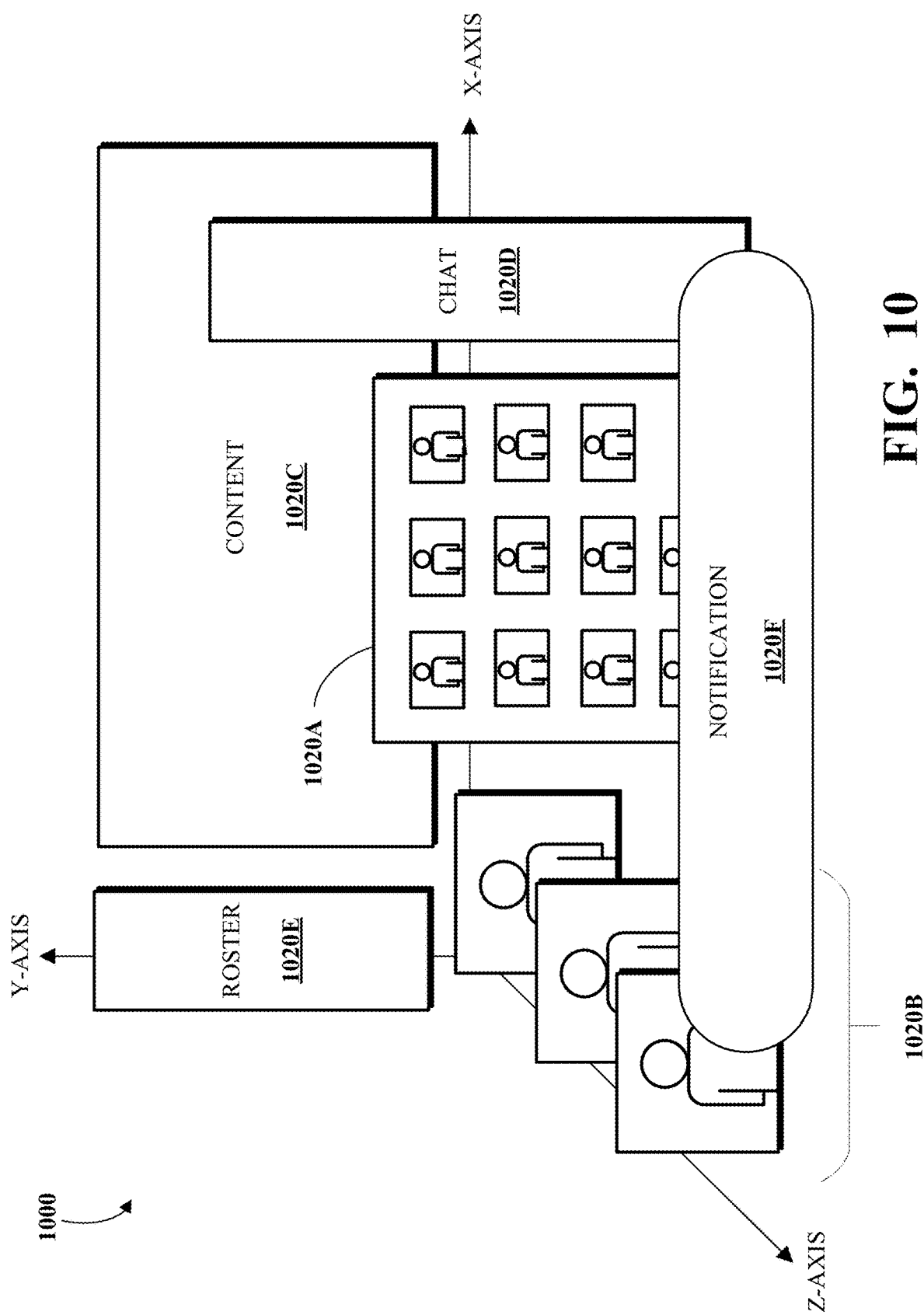
FIG. 10 is an illustration of an example of a GUI configured for display at an output interface in which a visual element comprising a notification message appears.

FIG. 10 is an illustration of an example of a GUI 1000 configured for display at an output interface in which a visual element comprising a notification message appears. The GUI 1000 may arrange visual elements 1020A through 1020E in a three-dimensional visual layout. In some implementations, the visual elements 1020A through 1020E may be configured in a manner like the GUI 700 shown in FIG. 7. The GUI 1000 could be configured for display at an output interface having three-dimensional properties like the output interface 510 shown in FIG. 5. Thus, the visual elements 1020A through 1020E may be arranged in many different ways in the GUI 1000. In one configuration, a characteristic may comprise a communication sent during the video conference (e.g., a notification message or "toast," such as from a virtual lobby or waiting area for participants waiting to join the conference). The communication may be configured to cause a visual element 1020F (e.g., the notification message) to appear at a location in the front of the GUI 1000 (e.g., in the depth dimension), such as in front of the visual elements 1020A through 1020E. The visual element 1020F may then move from front to back in the GUI 1000 (e.g., behind other visual elements, like the visual elements 1020A), and/or fade away, after a period of time.

Figure 11:
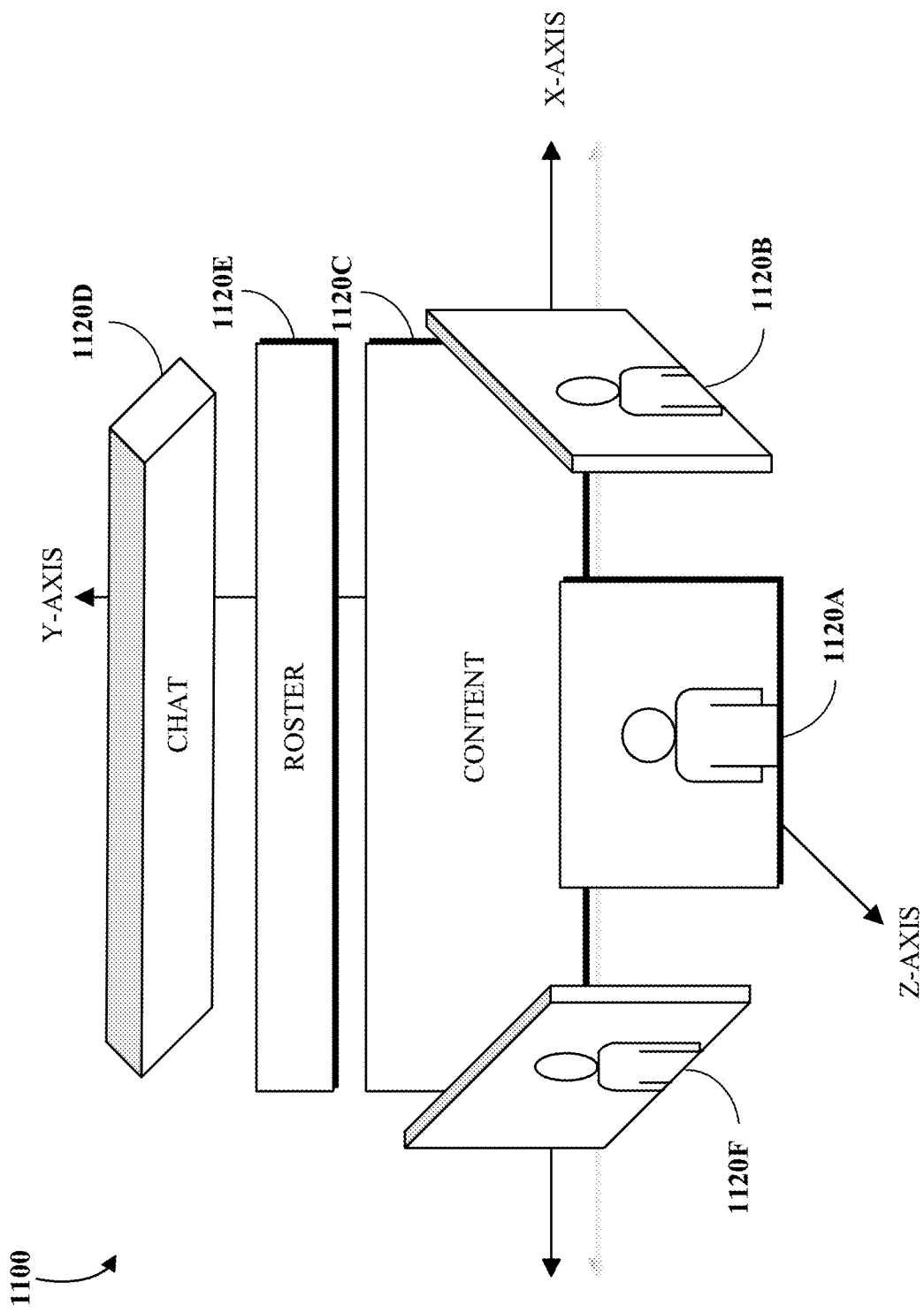
FIG. 11 is an illustration of an example of a GUI configured for display at an output interface in which visual elements are turned at angle.

FIG. 11 is an illustration of an example of a GUI 1100 configured for display at an output interface in which visual elements are turned at various angles. The GUI 1100 may arrange visual elements 1120A through 1120F in a three-dimensional visual layout. In some implementations, the visual elements 1020A through 1020E may be configured in a manner like the GUI 700 shown in FIG. 7. The GUI 1100 could be configured for display at an output interface having three-dimensional properties like the output interface 510 shown in FIG. 5. Thus, the visual elements 1120A through 1120F may be arranged in many different ways in the GUI 1100. In one configuration, visual elements 1120B and 1120F (e.g., video fees of participants) may be turned at angles relative to one another (e.g., facing different directions relative to one another) in the three-dimensional visual layout. In some implementations, a visual element may be turned at an angle in the three-dimensional visual layout based on a characteristic. For example, the characteristic may comprise an assignment of a participant to a virtual breakout session. The assignment may be configured to cause the visual elements 1120B and 1120F (e.g., video fees of participants assigned to particular sessions) to turn at angles relative to one another (e.g., facing different directions relative to one another) in the three-dimensional visual layout. In some implementations, a visual element may also be tilted from top to bottom in the three-dimensional visual layout (e.g., tilted downward), which tilting could also be based on a characteristic. For example, the visual element 1120D (e.g., chat messages between participants) may be appear at a location in the top of the GUI 1100 and may tilt downward (e.g., in the depth dimension) when a chat message is sent.

Figure 12:
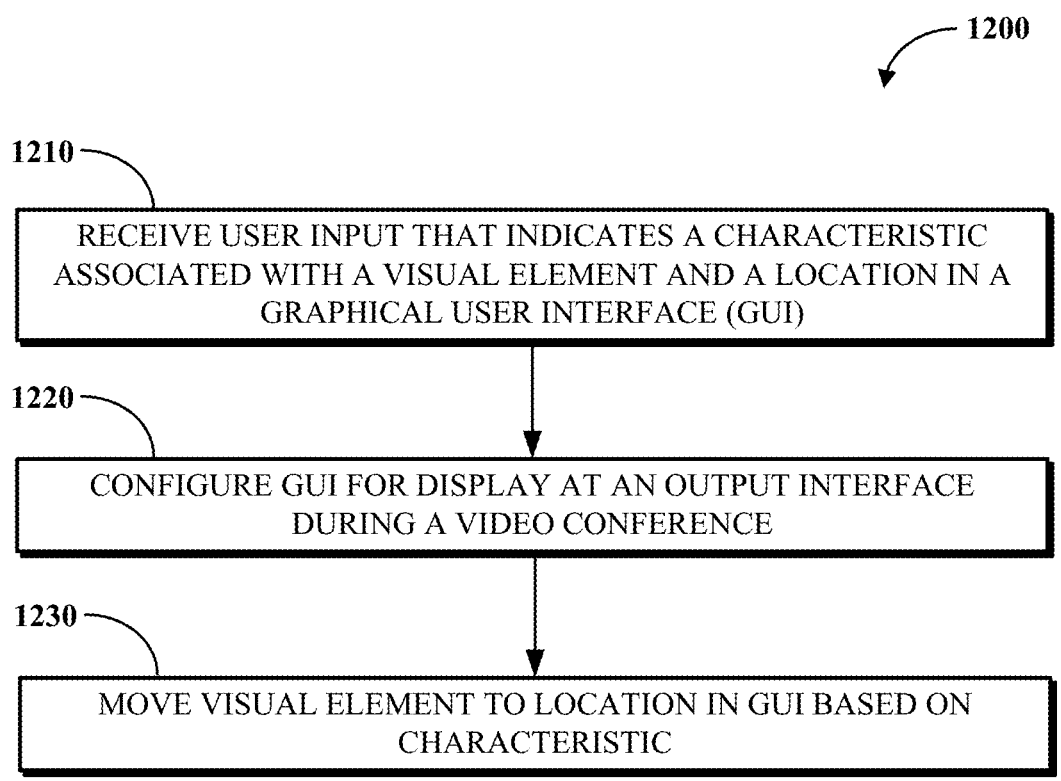
FIG. 12 is a flowchart of an example of a technique for configuring a GUI for display at an output interface during a video conference.

To further describe some implementations in greater detail, reference is next made to examples of techniques which may be performed by or using a system that configures a GUI for display at an output interface during a video conference. FIG. 12 is a flowchart of an example of a technique 1200 for configuring a GUI for display at an output interface during a video conference. The technique 1200 can be executed using computing devices, such as the systems, hardware, and software described with respect to FIGS. 1-11. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1210, conferencing software (e.g., client-side conferencing software associated with a conference device like one of the conference devices 410A through 410D, and/or server-side conferencing software associated with a server device like the server device 420) may receive user input that indicates a characteristic associated with a visual element and a location in a GUI. Visual elements may include, for example, video feeds associated with participants, static images associated with participants (such as pictures, symbols, icons, and the like, which could be used by participants when the participants are not using video feeds), content being shared between participants (e.g., documents, presentations, and videos), chat messages between participants, a roster of participants present in the conference, and/or other applications used during a conference. Characteristics associated with the visual elements may include, for example, communications during the video conference (e.g., a communication sent by a participant, such as an indication of a virtual hand being raised or a participant speaking); arrival of participants to the video conference (e.g., joining the video conference, in an order relative to other participants in the video conference); communication modalities being used by participants (e.g., a particular display and/or capture device used by a participant, which could have two-dimensional properties or three-dimensional properties); and/or assignment of participants to virtual breakout sessions. Locations in the GUI may include, for example, top, bottom, left, right, center, and/or combination thereof (e.g., in a two-dimensional visual layout), or top, bottom, left, right, center, front, back, angle, and/or combination thereof (e.g., in a three-dimensional visual layout). Thus, the location may include a coordinate location in the GUI and/or a direction in the GUI.

In some implementations, the conferencing software may receive the user input via a participant indicating selections, such as selections of a characteristic associated with a visual element and a location in the GUI. In some implementations, the conferencing software may receive the user input via a participant selecting a template that specifies characteristics associated with the visual elements and/or locations in the GUI in a predetermined visual layout. For example, the server device may communicate with a data structure (e.g., the GUI data structure 440) that stores multiple templates. The conferencing software may permit the participant, using a conference device (e.g., the conference device 410A), to select a template from the data structure via the server device. In some implementations, the participant may commit the template for use during the video conference. In some implementations, the participant may revise the template, such as by changing a characteristic associated with a visual element and/or changing a location in the GUI, as specified by the template. The participant may then commit the revised template for use during the video conference. This may permit the participant to customize a visual layout in a GUI for a participant's own environment, such as a physical meeting room accommodating a group of participants.

At 1220, the conferencing software may configure the GUI for display at an output interface during a video conference. For example, the conferencing software may configure a first GUI for display at an output interface associated with a first conference device (e.g., the conference device 410A); a second GUI for display at an output interface associated with a second conference device (e.g., the conference device 410B); and so forth. The output interface may, for example, be a display, such as a liquid crystal display, a cathode-ray tube, a light emitting diode display, virtual reality display, or other suitable display. In some implementations, the output interface may be a holographic display, a virtual reality display, a virtual reality headset, an alternate reality display, or an alternate reality headset. Thus, the GUI may be configured for display in a two-dimensional visual layout or a three-dimensional visual layout. In some implementations, the visual elements may be arranged in a two-dimensional visual layout having height and width dimensions. The visual elements may be displayed at an output interface having two-dimensional properties, such as a liquid crystal display, a cathode-ray tube, or a light emitting diode display. In some implementations, the visual elements may be arranged in a three-dimensional visual layout having height, width, and depth dimensions. The visual elements may be displayed at an output interface having three-dimensional properties, such as a holographic display, a virtual reality display, a virtual reality headset, an alternate reality display, or an alternate reality headset.

At 1230, the conferencing software may move a visual element to a location in the GUI based on a characteristic. The visual element may be moved during the video conference. In some implementations, moving the visual elements in the visual layout may include moving in two-dimensions, such as up and down and/or side to side. Moving the visual elements may also include resizing or fading the visual elements over a time period, and/or ordering the visual elements relative to one another, such as by overlapping one visual element with another. Moving the visual elements may involve calculating a change to position information associated with the visual elements, such as a change to Cartesian coordinates in two-dimensions. In some implementations, moving the visual elements in the visual layout may include moving in three-dimensions, such as up and down, side to side, and/or front to back. Moving the visual elements may also include turning at angles relative to one another (e.g., facing different directions relative to one another), tilting, resizing, or fading the visual elements over a time period, and/or ordering the visual elements relative to one another, such as by moving one visual element in front of or behind another. Moving the visual elements may involve calculating a change to position information associated with the visual elements, such as a change to Cartesian coordinates in three-dimensions.

Some implementations may include a method that includes: configuring a graphical user interface (GUI) for display at an output interface during a video conference, wherein the GUI comprises visual elements associated with participants of the video conference, and wherein the visual elements include at least one of video feeds or images associated with the participants; and moving, during the video conference, a first visual element of the visual elements to a location in the GUI based on a characteristic associated with the first visual element, wherein the characteristic and the location are based on user input. In some implementations, the method may include determining the characteristic and the location based on the user input, wherein the user input indicates selection of the characteristic and selection of the location; and arranging the first visual element in a two-dimensional visual layout. In some implementations, the method may include selecting a template that indicates at least one of the characteristic or the location, wherein the user input indicates a selection of the template. In some implementations, the characteristic is at least one of: a communication sent during the video conference; an arrival of a participant to the video conference; or a communication modality used during the video conference. In some implementations, the visual elements are arranged in a three-dimensional visual layout comprising a height dimension, a width dimension, and a depth dimension, and the method may include displaying the first visual element in the height dimension and the width dimension while moving the first visual element in the depth dimension. In some implementations, the method may include determining a first position information and a second position information for displaying the first visual element and a second visual element of the visual elements in a three-dimensional visual layout, respectively; and calculating a change to the first position information to move the first visual element in front of or behind the second visual element in the three-dimensional visual layout. In some implementations, the visual elements are arranged in a three-dimensional visual layout, and the method may include at least one of resizing or fading the first visual element when moving the first visual element. In some implementations, the visual elements are arranged in a three-dimensional visual layout, and the method may include arranging the first visual element at an angle relative to a second visual element of the visual elements in the three-dimensional visual layout. In some implementations, the method may include moving a second visual element of the visual elements to the location based on the characteristic being associated with the second visual element; and ordering the second visual element relative to the first visual element at the location.

Some implementations may include an apparatus that includes a memory; and a processor configured to execute instructions stored in the memory to: configure a GUI for display at an output interface during a video conference, wherein the GUI comprises visual elements associated with participants of the video conference, and wherein the visual elements include at least one of video feeds or images associated with the participants; and move, during the video conference, a first visual element of the visual elements to a location in the GUI based on a characteristic associated with the first visual element, wherein the characteristic and the location are based on user input. In some implementations, the processor is further configured to execute instructions stored in the memory to: determine the characteristic and the location based on the user input, wherein the user input indicates selection of the characteristic and selection of the location; and arrange the first visual element in a two-dimensional visual layout. In some implementations, the processor is further configured to execute instructions stored in the memory to: select a template that indicates at least one of the characteristic or the location, wherein the user input indicates a selection of the template. In some implementations, the visual elements are arranged in a three-dimensional visual layout comprising a height dimension, a width dimension, and a depth dimension, and the processor is further configured to execute instructions stored in the memory to: display the first visual element in the height dimension and the width dimension while moving the first visual element in the depth dimension. In some implementations, the processor is further configured to execute instructions stored in the memory to: determine a first position information and a second position information for displaying the first visual element and a second visual element of the visual elements in a three-dimensional visual layout, respectively; and calculate a change to the first position information to move the first visual element in front of or behind the second visual element in the three-dimensional visual layout. In some implementations, the visual elements are arranged in a three-dimensional visual layout, and the processor is further configured to execute instructions stored in the memory to: at least one of resize or fade the first visual element when moving the first visual element.

Some implementations may include a non-transitory computer readable medium that stores instructions operable to cause one or more processors to perform operations that include configuring a GUI for display at an output interface during a video conference, wherein the GUI comprises visual elements associated with participants of the video conference, and wherein the visual elements include at least one of video feeds or images associated with the participants; and moving, during the video conference, a first visual element of the visual elements to a location in the GUI based on a characteristic associated with the first visual element, wherein the characteristic and the location are based on user input. In some implementations, the operations may further include determining the characteristic and the location based on the user input, wherein the user input indicates selection of the characteristic and selection of the location; and arranging the first visual element in a two-dimensional visual layout. In some implementations, the operations may further include selecting a template that indicates at least one of the characteristic or the location, wherein the user input indicates a selection of the template. In some implementations, the visual elements are arranged in a three-dimensional visual layout comprising a height dimension, a width dimension, and a depth dimension, and the operations may further include displaying the first visual element in the height dimension and the width dimension while moving the first visual element in the depth dimension. In some implementations, the operations may further include determining a first position information and a second position information for displaying the first visual element and a second visual element of the visual elements in a three-dimensional visual layout, respectively; and calculating a change to the first position information to move the first visual element in front of or behind the second visual element in the three-dimensional visual layout.

An aspect may include a method that includes receiving an input from a first participant device to select a template that defines characteristics associated with visual elements and defines locations in a GUI. The method may include detecting, during a video conference, a first characteristic of the characteristics associated with a second participant device and a first visual element of the visual elements. The method may include moving, during the video conference, the first visual element to a first location in the GUI based on the first characteristic, wherein the first location overlaps with a second location in the GUI associated with a second visual element of the visual elements. The method may include adjusting an audio level associated with the second visual element based on the first location overlapping with the second location.

An aspect may include an apparatus that includes a memory and a processor. The processor may be configured to execute instructions stored in the memory. The processor may be configured to receive an input from a first participant device to select a template that defines characteristics associated with visual elements and defines locations in a GUI. The processor may be configured to detect, during a video conference, a first characteristic of the characteristics associated with a second participant device and a first visual element of the visual elements. The processor may be configured to move, during the video conference, the first visual element to a first location in the GUI based on the first characteristic, wherein the first location overlaps with a second location in the GUI associated with a second visual element of the visual elements. The processor may be configured to adjust an audio level associated with the second visual element based on the first location overlapping with the second location.

An aspect may include a non-transitory computer readable medium that stores instructions operable to cause one or more processors to perform operations. The operations may include receiving an input from a first participant device to select a template that defines characteristics associated with visual elements and defines locations in a GUI. The operations may include detecting, during a video conference, a first characteristic of the characteristics associated with a second participant device and a first visual element of the visual elements. The operations may include moving, during the video conference, the first visual element to a first location in the GUI based on the first characteristic, wherein the first location overlaps with a second location in the GUI associated with a second visual element of the visual elements. The operations may include adjusting an audio level associated with the second visual element based on the first location overlapping with the second location.

In one or more aspects, the visual elements may include shared content or a video feed. In one or more aspects, an audio level associated with the first visual element may be adjusted based on the first location overlapping with the second location. In one or more aspects, the first characteristic may be a communication sent during the video conference or an arrival of a participant to the video conference. In one or more aspects, the first visual element may be displayed in a heigh dimension and a width dimension while moving the first visual element in a depth dimension. In one or more aspects, a first position information and a second position information may be determined for displaying the first visual element and the second visual element of the visual elements. In one or more aspects, a change to the first position may be calculated to move the first visual element in front of or behind the second visual element in a three-dimensional visual layout. In one or more aspects, a resizing or fading of the first visual element may be performed when moving the first visual element. In one or more aspects, the first visual element may be arranged at an angle relative to the second visual element of the visual elements in a three-dimensional visual layout. In one or more aspects, the second visual element of the visual elements may be moved to a third location based on detecting a second characteristic. The second characteristic may be associated with the second visual element. In one or more aspects, the second visual element may be ordered relative to the first visual element at the first location. In one or more aspects, the first visual element may be arranged in a two-dimensional visual layout. In one or more aspects, a second template that indicates a second characteristic and the second location may be selected. In one or more aspects, the input may indicate a selection of the second template among multiple templates.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    receiving an input from a first participant device to select a template that defines characteristics associated with visual elements and defines locations in a graphical user interface (GUI);
    detecting, during a video conference, a first characteristic of the characteristics associated with a second participant device and a first visual element of the visual elements, wherein the first characteristic is an arrival, to the video conference, of a participant associated with the second participant device;
    moving, during the video conference, the first visual element to a first location in the GUI based on the first characteristic, wherein the first location overlaps with a second location in the GUI associated with a second visual element of the visual elements;
    adjusting an audio level associated with the second visual element based on the first location overlapping with the second location;
    causing, based on detecting the first characteristic, a third visual element to appear at a third location of the GUI, wherein the third visual element is a participant roster; and
    fading, based on not detecting an arrival of a participant to the video conference for a period of time, the third visual element.

2. The method of claim 1, wherein the visual elements include shared content.

3. The method of claim 1, further comprising:
    adjusting an audio level associated with the first visual element based on the first location overlapping with the second location.

4. The method of claim 1, wherein the visual elements are arranged in a three-dimensional visual layout and the adjusting the audio level comprises adjusting the audio level in a physical meeting room based on spatial mapping of the first visual element and the second visual element.

5. The method of claim 1, further comprising:
    displaying the first visual element in a height dimension and a width dimension while moving the first visual element in a depth dimension.

6. The method of claim 1, further comprising:
    determining a first position information and a second position information for displaying the first visual element and the second visual element of the visual elements in a three-dimensional visual layout, respectively; and
    calculating a change to the first position information to move the first visual element in front of or behind the second visual element in the three-dimensional visual layout.

7. The method of claim 1, wherein the visual elements are arranged in a three-dimensional visual layout.

8. The method of claim 1, further comprising:
    arranging the first visual element at an angle relative to the second visual element of the visual elements in a three-dimensional visual layout.

9. The method of claim 1, further comprising:
    moving the second visual element of the visual elements to a third location based on detecting a second characteristic associated with the second visual element; and
    ordering the second visual element relative to the first visual element at the first location.

10. An apparatus, comprising:
    a memory; and
    a processor configured to execute instructions stored in the memory to:
    receive an input from a first participant device to select a template that defines characteristics associated with visual elements and defines locations in a graphical user interface (GUI);
    detect, during a video conference, a first characteristic of the characteristics associated with a second participant device and a first visual element of the visual elements, wherein the first characteristic is an arrival, to the video conference, of a participant associated with the second participant device;
    move, during the video conference, the first visual element to a first location in the GUI based on the first characteristic, wherein the first location overlaps with a second location in the GUI associated with a second visual element of the visual elements;
    adjust an audio level associated with the second visual element based on the first location overlapping with the second location;
    cause, based on the detection of the first characteristic, a third visual element to appear at a third location of the GUI, wherein the third visual element is a participant roster; and
    fade, based on a non-detection of an arrival of a participant to the video conference for a period of time, the third visual element.

11. The apparatus of claim 10, wherein the visual elements include a video feed.

12. The apparatus of claim 10, wherein the processor is further configured to execute instructions stored in the memory to:
    display the first visual element in a height dimension and a width dimension while moving the first visual element in a depth dimension.

13. The apparatus of claim 10, wherein the processor is further configured to execute instructions stored in the memory to:

determine a first position information and a second position information to display the first visual element and the second visual element of the visual elements in a three-dimensional visual layout, respectively; and calculate a change to the first position information to move the first visual element in front of or behind the second visual element in the three-dimensional visual layout.

14. The apparatus of claim 10, wherein the processor is further configured to execute instructions stored in the memory to:

at least one of resize or fade the first visual element when moving the first visual element.

15. A non-transitory computer-readable medium storing instructions operable to cause one or more processors to perform operations comprising:

receiving an input from a first participant device to select a template that defines characteristics associated with visual elements and defines locations in a graphical user interface (GUI);

detecting, during a video conference, a first characteristic of the characteristics associated with a second participant device and a first visual element of the visual elements, wherein the first characteristic is an arrival, to the video conference, of a participant associated with the second participant device;

moving, during the video conference, the first visual element to a first location in the GUI based on the first characteristic, wherein the first location overlaps with a second location in the GUI associated with a second visual element of the visual elements;

adjusting an audio level associated with the second visual element based on the first location overlapping with the second location;

causing, based on detecting the first characteristic, a third visual element to appear at a third location of the GUI, wherein the third visual element is a participant roster; and fading, based on not detecting an arrival of a participant to the video conference for a period of time, the third visual element.

16. The non-transitory computer-readable medium storing instructions of claim 15, the operations further comprising:

determining the first characteristic and the first location based on the input, wherein the input indicates a first selection of the first characteristic and a second selection of the first location; and arranging the first visual element in a two-dimensional visual layout.

17. The non-transitory computer-readable medium storing instructions of claim 15, the operations further comprising:

selecting a second template that indicates a second characteristic and the second location, wherein the input indicates a selection of the second template among multiple templates.

18. The non-transitory computer-readable medium storing instructions of claim 15, wherein the visual elements are arranged in a three-dimensional visual layout and the adjusting the audio level comprises adjusting the audio level in a physical meeting room based on spatial mapping of the first visual element and the second visual element.

19. The non-transitory computer-readable medium storing instructions of claim 15, the operations further comprising:

determining a first position information and a second position information for displaying the first visual element and the second visual element of the visual elements in a three-dimensional visual layout, respectively; and calculating a change to the first position information to move the first visual element in front of or behind the second visual element in the three-dimensional visual layout.

20. The non-transitory computer-readable medium storing instructions of claim 15, the operations further comprising:

adjusting an audio level associated with the first visual element based on the first location overlapping with the second location.

\* \* \* \* \*